United States Patent [19]

Sugiyama et al.

[11] Patent Number: 4,797,742
[45] Date of Patent: Jan. 10, 1989

[54] DIVISIONAL IMAGE TRANSMISSION SYSTEM AND METHOD

[75] Inventors: Fumio Sugiyama, Sagamihara; Kenshi Dachiku, Machida, both of Japan

[73] Assignee: Kabushiki Kaisha Toshiba, Kawasaki, Japan

[21] Appl. No.: 14,016

[22] Filed: Feb. 12, 1987

[30] Foreign Application Priority Data

Mar. 31, 1986 [JP] Japan .................................. 61-072973

[51] Int. Cl.$^4$ ............................................... H04N 7/04
[52] U.S. Cl. ...................................... 358/141; 358/135
[58] Field of Search ................. 358/135, 136, 141, 12, 358/105

[56] References Cited

U.S. PATENT DOCUMENTS

| | | | |
|---|---|---|---|
| 4,541,012 | 9/1985 | Tescher | 358/133 |
| 4,546,386 | 10/1985 | Matsumoto et al. | 358/136 |
| 4,562,468 | 12/1985 | Koga | 358/135 |
| 4,667,233 | 5/1987 | Furukawa | 358/136 |
| 4,689,671 | 8/1987 | Ohki et al. | 358/136 |
| 4,707,738 | 11/1987 | Ferre et al. | 358/136 |
| 4,723,161 | 2/1988 | Koga | 358/135 |

OTHER PUBLICATIONS

Chen, et al., "Adaptive Coding of Monochrome and Color Images", IEEE Transactions on Communications, vol. COM-25, No. 11, Nov. 1977, pp. 1285-1292.
Proceedings of the IEEE, "Hybrid Image Coding and Vector Differential Pulse-Code Modulation", vol. 69, No. 3, Mar. 1981, p. 374.

Primary Examiner—James J. Groody
Assistant Examiner—Michael D. Parker
Attorney, Agent, or Firm—Foley & Lardner, Schwartz, Jeffery, Schwaab, Mack, Blumenthal & Evans

[57] ABSTRACT

In an image transmitting system such that an image frame is divided into plural blocks and video signals are transformed block by block in accordance with an orthogonal transform method before coding and transmission of the transform coefficients, transform coefficients are coded, only when differences in transform coefficient between the preceding frame and the current frame are significant, to reduce the coding speed and therefore the video signal transmission speed. In addition, transform coefficients are weighted under consideration of human visual characteristics (the weighting is increased with decreasing order of transform coefficient). Further, when only differences in transform coefficient are coded and transmitted, it is possible to further reduce the transmission speed.

15 Claims, 7 Drawing Sheets $C_n - C_{n-1} = \Delta C$

FIG.7 (a)
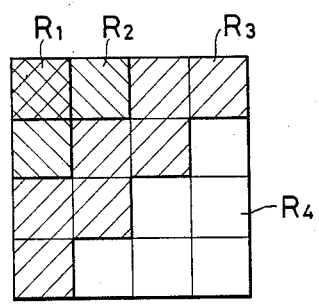
FIG.7 (b)
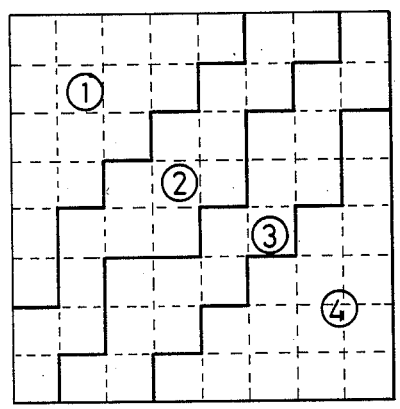
FIG.7 (c)
| 16 | 8 | 4 | 2 | 1 | $\frac{1}{2}$ | $\frac{1}{4}$ | |
|---|---|---|---|---|---|---|---|
| 8 | 4 | 2 | 1 | $\frac{1}{2}$ | $\frac{1}{4}$ | | |
| 4 | 2 | 1 | $\frac{1}{2}$ | $\frac{1}{4}$ | | | |
| 2 | 1 | $\frac{1}{2}$ | $\frac{1}{4}$ | | | | |
| 1 | $\frac{1}{2}$ | $\frac{1}{4}$ | | | | | |
| $\frac{1}{2}$ | $\frac{1}{4}$ | | | | | ∅ | |
| $\frac{1}{4}$ | | | | | | | |
| | | | | | | | |

$C_n - \overline{C_P} = \Delta C$

DIVISIONAL IMAGE TRANSMISSION SYSTEM AND METHOD

BACKGROUND OF THE INVENTION

1. Field of the Invention

The present invention relates to an image transmission system and the method by or in which an image scene is divided into a plurality of blocks, and video signals are transformed for each block in accordance with an orthogonal transform method and then coded before transmission.

2. Description of the Prior Art

As one of digital image transmission systems available for visual telephone or conference applicances, an orthogonal transform coding system is well known. In this system, an image frame is divided into a plurality of blocks, and a series of numerical sampled values transduced at picture elements are orthogonal transformed for each block, coded and then transmitted. On the receiver side thereof, the received digital signals are inversely transformed to reproduce video signals for each block, and then a complete frame is reproduced by integrating or scanning the divided video signals. The above system is described in detail in "DIGITAL IMAGE PROCESSING" published from NIKKAN KOGYO CO., by Masahiko Kiyuki, therefore which is incorporated herein by reference.

In this transformation method, cosine transform, Hadamard transform, KL transform, Harr transform, etc. are all adoptable. However, it has been considered that the most efficient coding system can be attained in accordance with Cosine transformation method. An example of the systems including a cosine transformer and an adaptive coder is described in "Adaptive Coding of Monochrome and Color Images" by When-Hsiuns Chen and Harrison Smith, IEEE TRANSACTION ON COMMUNICATIONS, VOL. COM-25, No. 11, NOV. 1977. The principle of this orthogonal transform coding system will briefly be described hereinbelow. First, video signals are transduced at picture elements and A/D converted, and then the converted digital video signals are divided into a plurality of blocks each composed of 64 picture elements of vertical 8 lines and horizontal 8 pixels, for instance. The divided video signals are cosine transformed block by block, and then the cosine transform coefficients are coded and transmitted. On the receiver side, the coded cosine transform coefficients are decoded, inversely cosine transformed to obtain video signals for each block, and then the video signals of each block are integrated by use of a memory unit. Thereafter, the integrated video signals are scanned to reproduce digital video information signals for each frame, and then D/A converted to obtain the original analog video signals.

By the way, it is well known that power (the product of the amplitude and the time) of the transformed cosine coefficients is high in specific components (low-order cosine coefficients) on the basis of the statistical characteristics of video signals. Therefore, in this method, video signals are quantized by allocating many bits to higher power components and small bits to lower power components under consideration of human visual characteristics in order that the transmission speed can be reduced and the coding efficiency can be improved. Recently, Codec has reported an orthogonal transform coding system with a transmission speed of 1.5 Mbps.

This Codec orthogonal transform coding system has fairly improved the coding efficiency; however, the transmission speed required for image transmission is still high as compared that required for audio or other data signals, thus resulting in a problem in that the image communications are still high in cost.

In this connection, the data transmission speed is 64 kbit/sec in audio signal but as high as 100 Mbit/sec in video signal. Therefore, ordinary CMOS logic circuits can be adopted for audio signal transmission; however, ECL (emitter coupled logic) circuits should be adopted for video signal transmission.

SUMMARY OF THE INVENTION

With these problems in mind, therefore, it is the primary object of the present invention to provide an image transmission system of higher coding efficiency which can reduce the transmission speed so that a transmission channel can be utilized more effectively.

To achieve the above-mentioned object, the image transmission system according to the present invention comprises: (a) dividing means for dividing an image frame into a plurality of blocks; (b) transforming means responsive to said dividing means, for transforming video information signals block by block to generate transform coefficients in accordance with an orthogonal transform method; (c) detecting means responsive to said transforming means, for detecting differences in transform coefficients between a current frame and a past frame for each block and outputting a difference presence signal when a sum of the detected difference in transform coefficients in each block exceeds a predetermined threshold; and (d) coding means responsive to said transforming means and said detecting means, for coding and transmitting the transform coefficients block by block in response to the difference presence signal outputted from said detecting means.

That is, in the first aspect of the present invention, transform coefficients representative of video signals are coded and transmitted block by block only where there exists a significant difference in transform coefficient between the current frame and the preceding frame.

The detected differences in transform coefficient are weighted in such a way that the lower the transform coefficient order is, the greater will be the weighting.

Further, according to another aspect of the present invention, in place of coding and transmitting transform coefficients, it is also preferable to calculate a difference in transform coefficient between a current frame and a past frame in order to code and transmit only calculated transform coefficient differences in response to the difference presence signal. In this modification, it is possible to further reduce the transmission speed by additionally incorporating in the system a motional vector detector for detecting a parallel motion distance between a current frame and a past frame to obtain a motional vector $V_M$, and a motion compensator for compensating the transform coefficient of the past frame with the detected parallel motion distance before comparison between the past frame and the current frame.

Further, to achieve the above-mentioned object, the image transmission method according to the present invention comprises the following steps of: (a) dividing an image scene into a plurality of blocks; (b) transforming video signals block by block to generate transform coefficients in accordance with an orthogonal transform method; (c) detecting a difference in transform coefficient between a current frame and a past frame for each block to output a difference presence signal when a sum of the detected differences in transform coefficient in each block exceeds a predetermined threshold; and (d) coding and transmitting the transform coefficients block by block only when the difference presence signal is detected.

In detecting a difference in transform coefficient, a current transform coefficient is delayed to obtain a preceeding transform coefficient relative to the current transform coefficient, and the preceding transform coefficient is subtracted from the current transform coefficient to obtain a difference between the two. Thereafter, all the differences are added before comparison with the threshold to obtain a difference presence signal for each block.

The difference in transform coefficient is weighted in such a way that the lower the transform coefficient order is, the greater will be the weighting, before adding all the transform coefficient differences.

Further, in detecting a difference in transform coefficient, matrices are formed on the basis of the transform coefficients for each block, and the formed matrix is divided into several domains. A difference in matrix value between the current frame and the preceding frame is detected at each divided domain of each block and then compared with a threshold to generate a difference presence signal.

The transform coefficient matrix is divided into plural domains being arranged from the lowest-order matrix coefficient to the highest-order matrix coefficient.

In summary, in the image transmission system according to the present invention, since no video signals are coded when the difference in transform coefficient between the preceding frame and the current frame is not significant, it is possible to reduce the coding speed and therefore the video signal transmission speed. In addition, since amplitude weighting of transform coefficients is made under consideration of human visual characteristics (the weighting is increased with decreasing order of transform coefficient), it is possible to further improve the transmission speed. Further, when only differences in transform coefficient are adaptive-coded before transmission, it is possible to improve the accuracy of image transmission when an image varies little by little.

BRIEF DESCRIPTION OF THE DRAWINGS

The features and advantages of the image transmission system and method according to the present invention will be more clearly appreciated from the following description of the preferred embodiments of the invention taken in conjunction with the accompanying drawings in which like reference numerals designate the same or similar elements or sections throughout the figures thereof and in which:

FIG. 6 (b) shows cosine transform matrices each corresponding to each of the pattern planes shown in FIG. 8 (a);

FIG. 7 (a) shows an example of matrix domains in a block of 4 lines×4 pixels;

FIG. 7 (b) shows another example of matrix equidomains (16 elements) in a block of 8 lines×8 pixels;

FIG. 7 (c) shows an example of coefficient weighting table in a block of 8 lines×8 pixels;

FIG. 8 (b) shows matrix domains in the same block for assistance in explaining a selective domain transmit method such that only the domains in which the coefficient difference exceeds a threshold are selectively transmitted;

DETAILED DESCRIPTION OF THE PREFERRED EMBODIMENTS

Embodiments of the present invention will be described hereinbelow with reference to the attached drawings.

Figure 1:
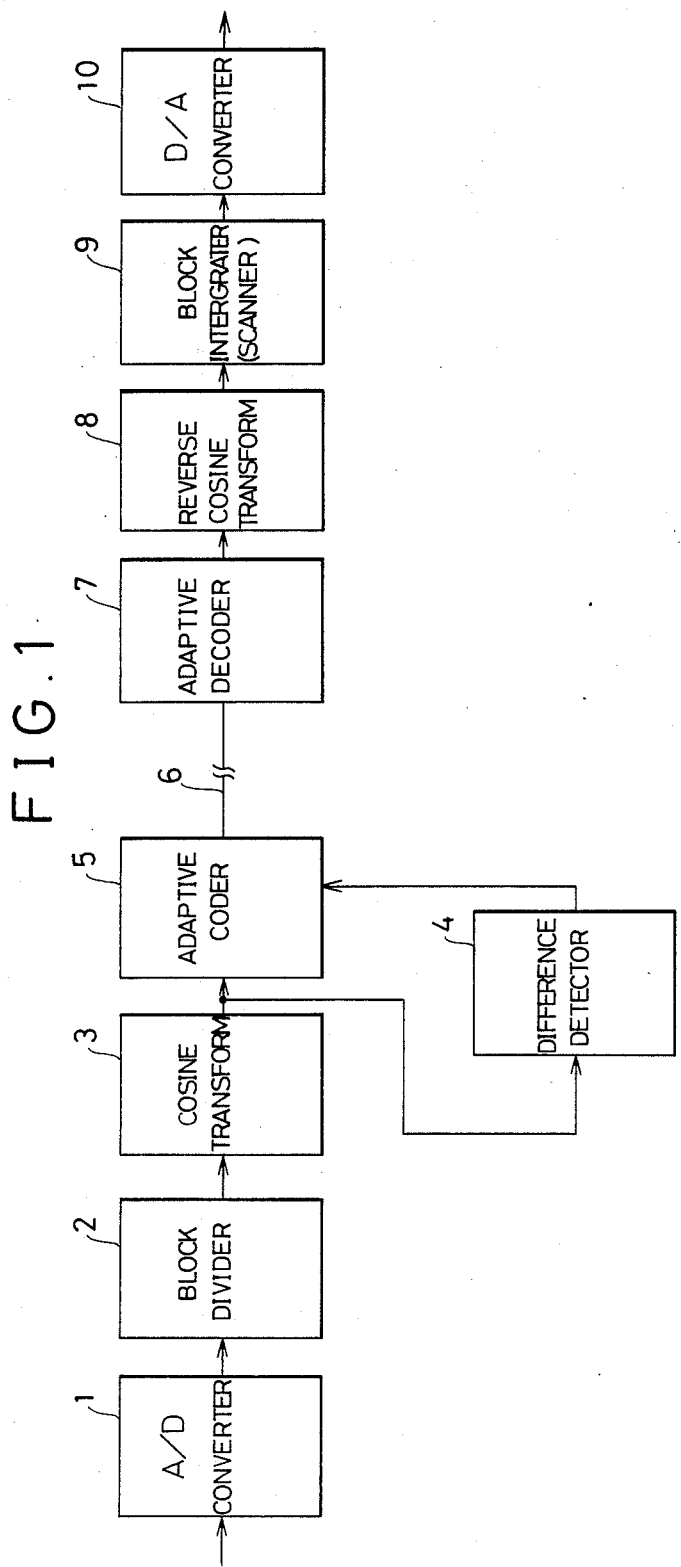
FIG. 1 is a schematic block diagram showing a first embodiment of the image transmission system and the image receiver system according to the present invention.

FIG. 1 shows a system configuration of a first embodiment of the present invention. The system can be divided into two, transmitter and receiver, units. The transmitter unit includes an A/D converter 1, a block divider 2, a cosine transformer 3, a difference detector 4 and an adaptive coder 5, while the receiver unit includes an adaptive decoder 7, an inverse cosine transformer 8, a block integrator (scanner) 9 and a D/A converter 10. The two units are connected through a transmission line 6 as shown.

The A/D converter 1 converts video signals obtained at picture elements from analog to digital and outputs gradation video signals of 8 bits, for instance. The block divider 2 divides the digital video signals into blocks each composed of 8×8=64 picture elements, for instance, through a frame memory. The cosine transformer 3 receives the video information signals divided by the divider 2 and transforms the video signals block by block in accordance with cosine transform method.

Figure 2:
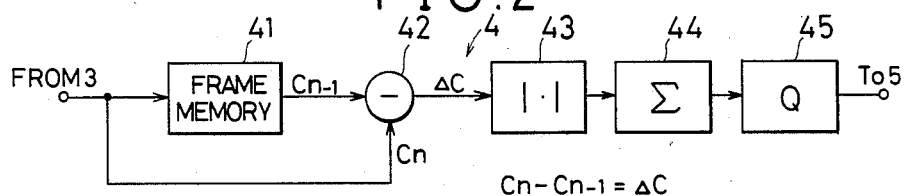
FIG. 2 is a block diagram showing a first example of a coefficient difference detector incorporated in the system shown in FIG. 1.

The difference detector 4 compares cosine transform coefficients of the current frame with those of the preceding frame block by block, and output a difference presence signal when the difference in transform coefficient between the current frame and the preceding frame exceeds a predetermined threshold. This difference detector 4 is configured as shown in FIG. 2, in which the detector 4 is made up of a frame memory 41, a subtracter 42, an absolute circuit 43, an adder 44 and a quantizer 45 including a comparator (not shown). In this difference detector 4, the preceding cosine transform coefficients $C_{n-1}$ one frame delayed through the frame memory 41 are subtracted by the subtracter 42 from the current cosine transform coefficients $C_n$ in sequence block by block. The subtrated coefficient values are passed through the absolute circuit 43 to obtain absolute difference values. The adder 44 accumulatively adds the obtained absolute difference values to obtain a total coefficient difference values for each frame. The quantizer 45 quantizes the obtained total difference value to output a quantized difference presence signal to the adaptive coder 5 block by block. Here, when the quantization is binary, the accumulative addition signals (the total) are to be compared with a constant threshold value. Further, the function of this difference detector 4 is to determine whether or not there exists a quantity or significance of image information to be transmitted. Therefore, it is desirable to determine the presence or absence of the significant video information signals under consideration of human visual characteristics. That is, since sensitivity is high in lower-order components of the cosine transform coefficients in the case of human visual characteristics, it is preferable to increase the weighting of lower-order coefficients as compared with that of higher-order coefficients.

Figure 3:
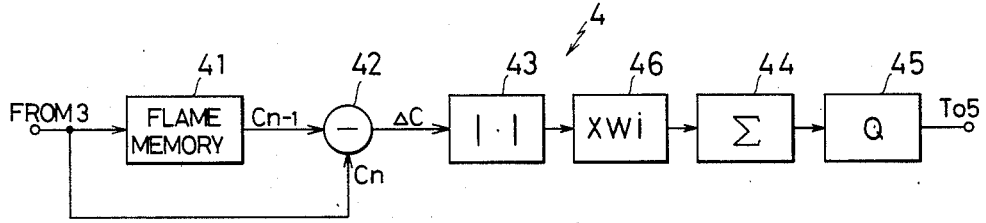
FIG. 3 is a block diagram showing a second example of the coefficient difference detector.

FIG. 3 shows a modification of the difference detector 4, in which a weighting multiplier 46 is additionally connected between the absolute circuit 43 and the adder 44 in order to multiply lower-order coefficients by a large multiplier but higher-order coefficients by a small multiplier so that high frequency noise will not be transmitted. By use of the difference detector 4 as shown in FIG. 3, it is possible to more appropriately detect the difference information between the present cosine transform coefficient and the preceding cosine transform coefficient. In this connection, where a differences in luminance signals between two different succeeding frames are simply calculated on the time axis without implementing the above-mentioned orthogonal transform coding, it is impossible to perform the above weighting operation, because the hardware configuration becomes huge.

The adaptive coder 5 adaptively codes the cosine transform coefficients obtained by the cosine transformer 3 in response to the difference presence signal detected by the difference detector 4, and transmits the coded signals through the transmission line 6 to the receiver unit only when the difference in transform coefficient between two successive frames is significant.

Figure 4:
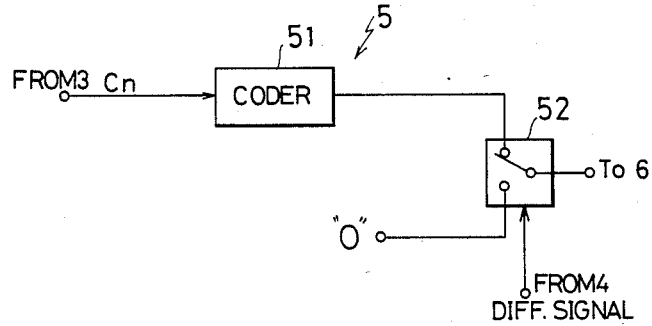
FIG. 4 is a block diagram showing an adaptive coder incorporated in the system shown in FIG. 1.
Figure 5:
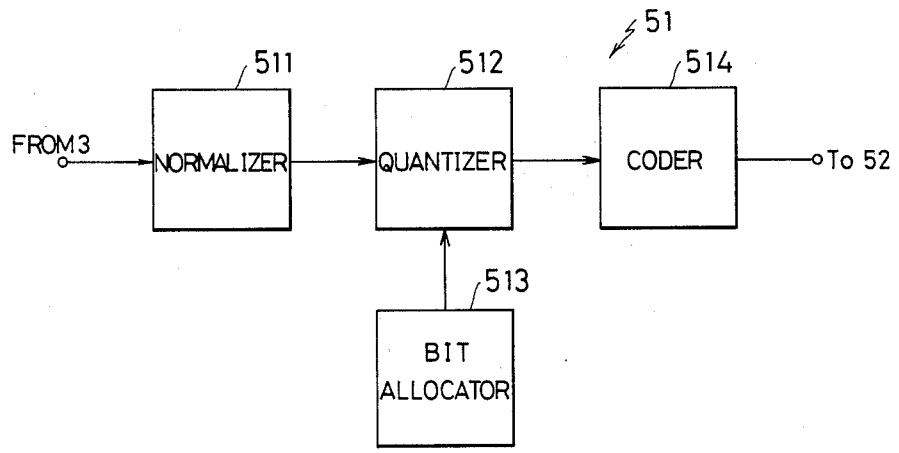
FIG. 5 is a block diagram showing a coder incorporated in the adaptive coder shown in FIG. 4.

This adaptive coder 5 includes a coder 51 and a selector switch 52 to selectively output a "0" signal or a significant of the coder 51 as it is, as shown in FIG. 4. The coder 51 includes a normalizer 511, a quantizer 512, a bit allocator 513, and a coding circuit 514 as shown in FIG. 5. The inputted cosine transform coefficients are normalized by the normalizer 511, where necessary, and then quantized by the quantizer 512 before being coded. In this quantization, the number of bits for quantization is determined by the bit allocator 513 in such a way that many bits are allocated to the low-order coefficient but small bits are allocated to the high-order coefficients. The quantized digital signals are coded by the coding circuit 514.

The above normalization is necessary where cosine transform coefficients are high in signal level as when a motional picture is transmitted. In such a case, the high coefficient level is divided by a predetermined value to an appropriate level before quantization.

In the above image data transmission, various signals such as buffering control signals, entropy coding signals, parallel-to-serial conversion signals and other control signals (normalization signal, reproducing signals) are multiplexed together with the coded video signals. The buffering control signals serve to temporarily store adaptive coded signals and then transmit them at a constant speed when a picture changes violently in motion; the entropy coding signals serve to code the number of the same digits when "1" of "0" continues; the parallel-to-serial transformation signals serve to convert parallel input signals to serial input signals or vice versa, where necessary.

Further, block address designation signals are transmitted being multiplexed together with the video information signals, frame synchronization signals, etc., as is well known.

In summary, in the above adaptive coding operation, bits are allocated to the cosine transform coefficients only when a difference in coefficient between the current and the preceding frames is significant; while no bit is allocated thereto when the difference is small. In other wards, only significant coefficients are coded, but non-significant coefficients are not coded for providing a higher coding efficiency.

The receiver unit includes an adaptive decoder 7, an inverse cosine transformer 8, a block integrator (e.g. scanner) 9 and a D/A converter 10, which operates in the manner opposite to the transmitter unit. In more detail, the adaptive decoder 7 decodes the coded video information signals transmitted block by block through the transmission line 6 in the manner opposite to the adaptive coder 5. When differences in the cosine transform coefficients between the current frame and the preceding frame is great, since the video signals are transmitted together with a block address data and a bit allocation data, the cosine transform coefficients are inversely quantized in accordance with a bit allocation table to decode the coefficient designated by the block address data into a digital video signal corresponding thereto. When no address is transmitted, the preceding (past) cosine transform coefficient is used as the current cosine transform coefficient.

The inverse cosine transformer 8 inversely cosine transforms the video information signals decoded block by block by the adaptive decoder 7 to reproduce video information signals for each block.

The block integrator (scanner) 9 integrates or scans reproduced video information signals outputted from the inverse cosine transformer 8 block by block, by use of an internal memory unit, to generate the video information signals frame by frame.

The D/A converter D/A converts the video information signals integrated for each frame to finally reproduce analog video signals.

In the above-mentioned first embodiment, since a difference in cosine transform coefficient between the current frame and the preceding frame is calculated in unit of block, and further the transform coefficients are coded and transmitted only when there exists a big difference in coefficient between the two, it is possible to improve the signal coding efficiency. In addition, since the signal level of coefficient difference is determined in unit of block (block by block), the addresses to be transmitted (multiplexed) are relatively small in number.

In the first embodiments, the difference in transform coefficient between the preceding and current frames are determined by calculating each difference, coefficient by coefficient (for each picture element), and then adding the calculated differences block by block (for each block) before comparing the block difference with a threshold.

In order to further improve the coding efficiency, it is preferable to arrange the detected coefficients in a predetermined order, divide the arranged coefficients into some domains in accordance with a predetermined rule, calculate differences in coefficient within the same divided domain, and weight the significant difference in different manner for each divided domain. In this case, the coefficient difference is weighted in such a way that the lower the transform coefficient order is, the greater will be the weighting under consideration of the human visual characteristics.

To achieve the above-mentioned selective domain transmit method, it is preferable to adopt cosine transform coefficient matrices and to divide the coefficient matrix along lines perpendicular to a diagonal line extending from the lowest-order coefficient (the upper left corner) to the highest-order coefficient (the lower right corner).

The above method of weighting the coefficient differences on the basis of coefficient matrices will be described in further detail.

In general, when video signals are cosine transformed, the flatter the image is; the lower order will be the cosine transform coefficient. Further, the finer the image is; the higher order will be the cosine transform coefficient.

Figures 6A, 6B:
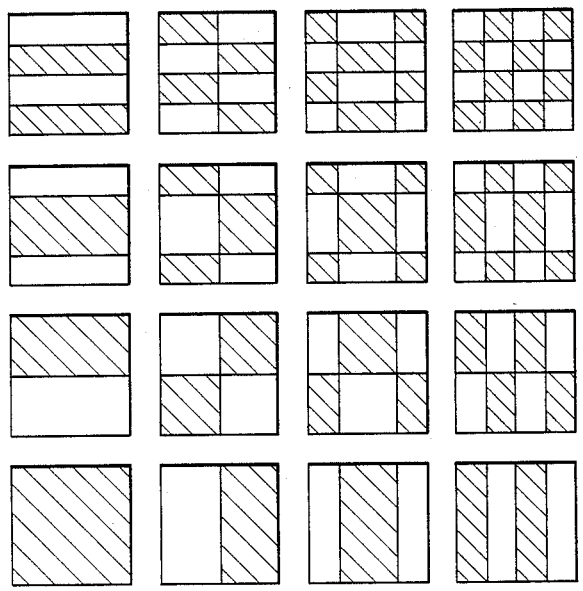
FIG. 6 (a) shows cosine transform basis image pattern planes of a block of 4 lines×4 pixels, in which the shaded portions indicate coefficients of +1, and the white portions indicate coefficients of −1.

FIG. 6 (a) shows 16 basic image patterns of a block of 4×4 picture elements, and FIG. 6 (b) shows 16 transform coefficient matrices each corresponding to each of image patterns shown in FIG. 6 (a). In FIG. 6 (b) a dc (the lowest order) component of the cosine transform coefficient is located at the upper left corner thereof and a highest-order component thereof is located at the lower right corner thereof.

FIG. 7 (a) shows an example in which the transform coefficient matrix (4×4) is divided into four domains $R_1$ to $R_4$. In FIG. 7 (a), $R_1$ denotes a dc component by which the luminace is directly controlled. Therefore, it is necessary to always transmit the dc component located in the domain $R_1$. The domain $R_4$ can be set to zero without transmission because this domain corresponds to high-order coefficients. The coefficients located within the domains $R_2$ and $R_3$ are given to two different difference detectors 4, separately to obtain each absolute sum of the coefficient differences between the current and preceding frames for each domain $R_2$ or $R_3$.

FIG. 7 (b) shows a coefficient matrix divided into four domains each including the same 16 picture elements. When the matrix is divided as shown in FIG. 7 (b), some experiment indicates that the domain 1 includes significant information of 99% or more; the domain 2 includes that of 1% or less; and the domains 3 and 4 include no significant information.

FIG. 7 (c) shows an example of weighting tables. In this example, amplitude weightings (16, 8, 4, 2, 1, ½, ¼) for cosine transform coefficients are listed in a coefficient matrix table of 8×8 elements. In this weighting table, since significant image information signals are not included in the higher-order domains, the signals within the higher-order domains are not transmitted (always set to zero). On the other hand, since significant image information signals are included in the lower-order domains, the significant lower-order coefficients are divided into some domains; the differences in coefficient within the same domain are calculated between the current and preceding frame and compared with a threshold; and the calculated significant differences are weighted in different manner as listed in FIG. 7(c), so that the significant coefficients can selectively be coded and transmitted.

The effectiveness of selective domain transmission method as explained above will be described in comparison with fixed domain transmission method with reference to FIGS. 8 and 9.

Figure 8A:
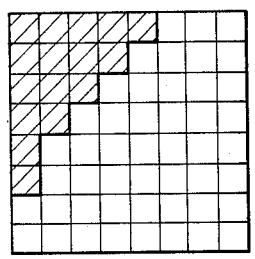
FIG. 8 (a) shows a matrix domain in a block (8×8) for assistance in explaining a fixed domain transmit method such that all the coefficients located in the fixed domain are transmitted at all times.
Figure 8B:
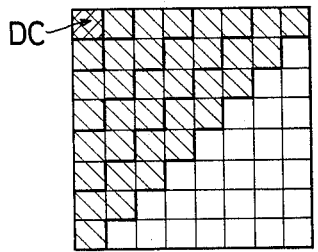

In the fixed domain transmission method, coefficients located in the lower-order domains as shown in FIG. 8 (a) are always transmitted. On the other hand, in the selective domain transmission method, coefficients located in the lower-order domains as shown in FIG. 8 (b) are transmitted by selecting only the domains in which significant differences in information between the current and the preceding frames are included. In this case, the dc component at the upper left corner is always transmitted as already explained.

Figure 9:
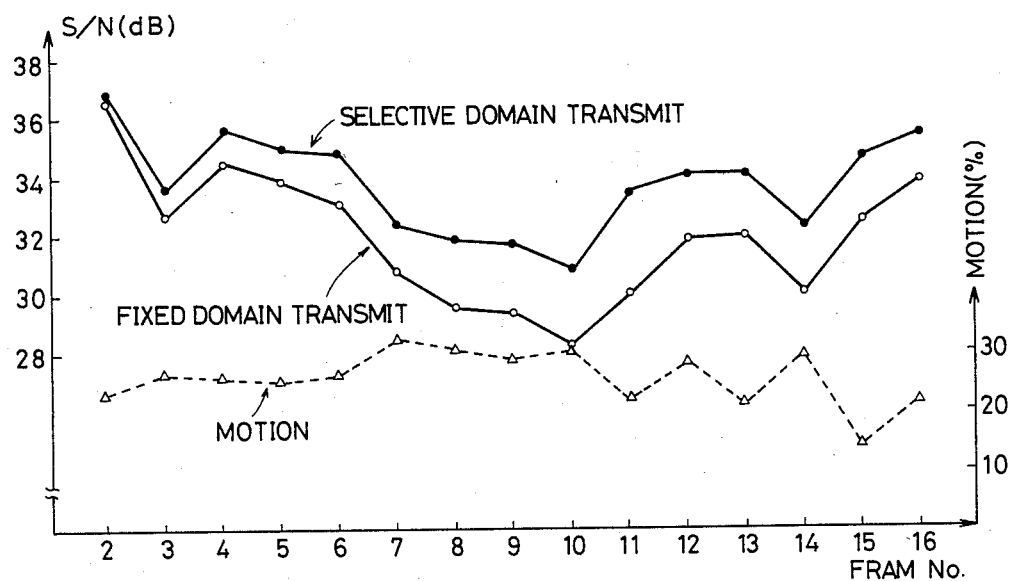
FIG. 9 is a graphical representation showing the comparison in S/N ratio between a fixed domain transmit method and a selective domain transmit method.

FIG. 9 shows the S/N ratio (dB) in comparison between the selective domain transmission method and the fixed domain transmission method. This graph indicates that it is possible to improve the S/N ratio by about 2 dB, in particular, when picture moves violently. Further, in this case, the number of transmitted blocks was about 240 blocks per frame in the fixed domain transmit method and about 360 blocks per frame in the selective domain transmit method, and the number of coded bits was about 0.25 bit per pixel.

Further, when a picture moves violently, distortion is noticeable at each block in the case of the fixed domain transmit method; however, distortion is not noticeable in the case of the selective domain method. Further, although the contour of an image already transmitted remains a little in both the cases, the degree is small in the selective domain transmit method. These may be due to the fact that many information signals can be adaptively selected from domains including higher order domains in the selective domain transmit method.

Figure 10:
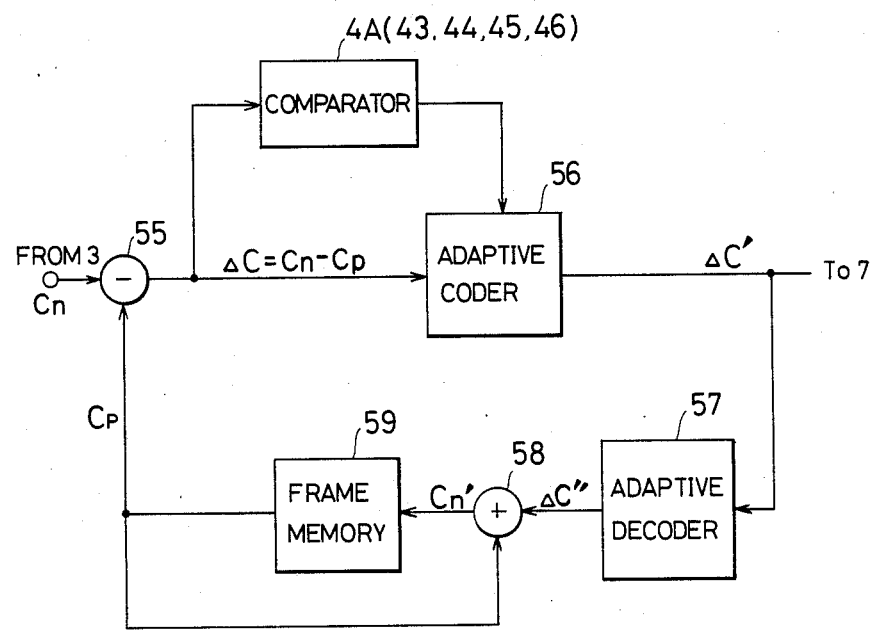
FIG. 10 is a partial block diagram showing a second embodiment of the image transmission system according to the present invention.

FIG. 10 shows a second embodiment of the image transmission system according to the present invention. In the first embodiment shown in FIGS. 1 to 5, the cosine transform coefficients obtained by the cosine transformer 3 are directly adaptive-coded by the adaptive coder 5 before transmissioin. Further, the coefficient difference presence signals from the difference detector 4 are obtained by calculating the difference in cosine transform coefficient between the current frame and the preceding frame. In this second embodiment, however, the differences in transform coefficient ($\Delta C = C_n - C_p$) between the current value $C_n$ (the current frame) and the past value $C_p$ (the latest frame) are coded and transmitted in place of transform coefficients. Further, the coefficient difference presence signals from the difference detector 4 are obtained by calculating the difference between the current frame and the latest frame (not the preceding frame).

In more detail, as shown in FIG. 10, the difference detector 4 and the adaptive coder 5 in combination include a subtractor 55, an adaptive coder 56, an adaptive decoder 57, an adder 58, a frame memory 59, and a comparative 4A including elements 43, 44, 45 and 46 all shown in FIGS. 2 and 3.

The cosine transform coefficients $C_n$ are applied to one input of the subtractor 55. To the other input of the subtractor 55, the past cosine transform coefficients $C_p$ which have already been transmitted in the past are applied. Therefore, a coefficient difference signals ($\Delta C = C_n - C_p$) between the two are outputted from the subtractor 55. The obtained difference signal $\Delta C$ is coded by the adaptive coder 56 on the basis of an adaptive control signal applied from the comparator 4A having almost the same circuit configuration shown in FIG. 2 or 3 as in the first embodiment. That is, the coefficient difference signals ($\Delta C = C_n - C_p$) between the current and the past cosine transform coefficient signals are coded into a coded coefficient difference signals $\Delta C'$ including a quantization error by the adaptive coder 56 in response to the difference presence signal applied from the comparator 4A.

The coded difference signals $\Delta C'$ are transmitted through the transmission line to the receiver unit and simultaneously applied to the adaptive decoder 57 on the transmitter side to decode the coefficient difference signal $\Delta C'$. The difference signals $\Delta C'$ decoded on the transmitter side are applied to one input of the adder 58. To the other input terminal of the adder 58, the past coefficient signals $C_p$ (including a quantization error) are applied. Therefore, the coefficient signals ($C_n' = \Delta C'' + C_p$) are outputted from the adder 58 to the frame memory 59. Therefore, there exist various cases where the difference signal $\Delta C = C_n - C_p$ represents a difference between the current coefficient $C_n$ and the preceding coefficient $C_{n-1}$ (one frame before) in some blocks or a difference between the current coefficient $C_n$ and the past coefficient $C_p$ (several frames before) in other blocks.

The adaptive coder 56 can be configured as shown in FIGS. 4 and 5. That is, if the coefficient difference signal $\Delta C$ is great, the switch 52 is set so that the adaptive coder 56 is selected and connected to the transmission line 6 for coding operation and bits are allocated by the bit allocator 513 after normalization if necessary. On the other hand, if the difference signal $\Delta C$ is small, "0" is selected and connected to the transmission line 6 without bit allocation and signal transmission. In this case, since the output of the adaptive decoder 56 is also set to "0", the coefficient stored at an address corresponding to the block stays unchanged in the frame memory 59.

In this second embodiment, since transform coefficients are held, and the transmission has been suspended, no transmission is made at blocks where no significant transform coefficients exist therefore, the transmission efficiency can further be improved and thus it is possible to more effectively utilize a transmission channel. Further, where video information signals at each block varies little by little, it is possible to effectively detect the difference between the two, and thus it is possible to enhance the accuracy of signal difference detection.

Figure 11:
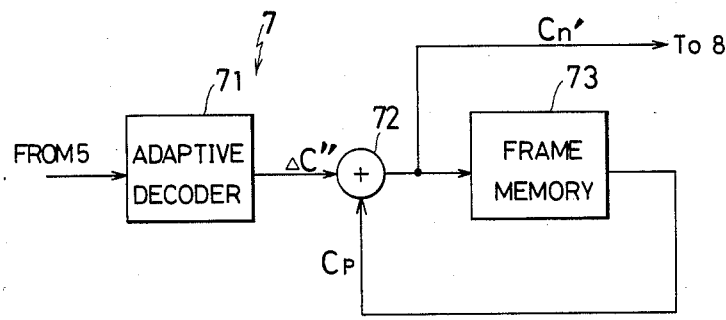
FIG. 11 is a partial block diagram showing an adaptive decoder incorporated in the image receiver unit of the second embodiment according to the present invention.

Further, on the receiver side of this second embodiment, the adaptive decoder 7 can be configured by an adaptive decoder 71, an adder 72, and a frame memory 73 as shown in FIG. 11. In this configuration, the reproduced cosine transform coefficient signal $C_n'$ can be obtained from the output of the adder 72 because $C_n'C_p = C + \Delta C'$. In the above description, prime (') indicates a value including a quantization error.

Figure 12:
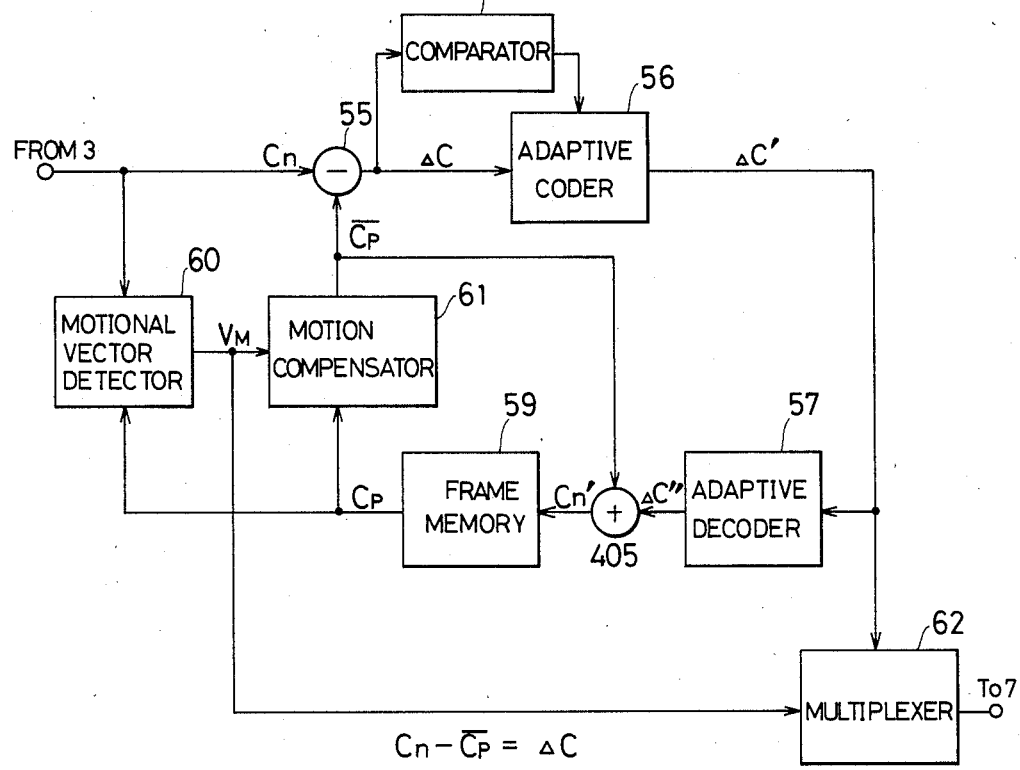
FIG. 12 is a partial block diagram showing a third embodiment of the image transmission system according to the present invention.
Figures 13A, 13B, 13C:
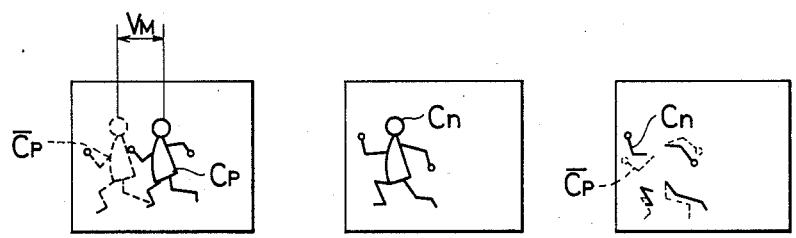
FIG. 13(a)–FIG. 13(c) are a series of illustrations for assistance in explaining the operation of the system shown in FIG. 12.

FIGS. 12 and 13 show the third embodiment of the image transmission system according to the present invention. In this embodiment, in order to further reduce the number of difference signals $\Delta C$ in transform coefficient between the current frame and the past frame, a parallel movement distance between the current frame and the preceding (or past) frame is calculated and the past coefficient $C_p$ is moved in parallel to such a position that the major current and past images can be superposed.

The system configuration shown in FIG. 12 further comprises a motional vector detector 60, a motion compensator 61 and a multiplexer 62 in addition to the elements shown in FIG. 10.

The current cosine transform coefficient $C_n$ is applied to one input of the motional vector detector 60, while the past cosine transform coefficient $C_p$ stored in the frame memory 59 is applied to the other input of the motional vector detector 60. The motional vector detector 60 forms a motional vector $V_M$ representative of a distance between the current and past images (coefficients). The formed motional vector VM is outputted to the motion compensator 61 and the multiplexer 62. The motion compensator 61 shifts the past transform coefficients $C_p$ outputted from the frame memory 59 in the parallel direction by a distance correspondi-ng to the motional vector $V_M$, and the shifted coefficients $\overline{C_p}$ are applied to the subtracter 55 to obtain a difference $\Delta C$ between $\overline{C_p}$ and $C_n$. Further, the above motional vector is detected block by block.

FIG. 13 shows a series of image illustrations for assistance in explaining the third embodiment shown in FIG. 12. In the case where the past transform coefficients $C_p$ representative of an image shown by solid lines in FIG. 13 (a) are stored in the frame memory 59 and applied to the motional vector detector 60, and further those $C_n$ representative of a new image shown by solid lines in FIG. 13 (b) are inputted to the motional vector detector 60, a distance between $C_n$ and $C_p$ is detected as a motional vector $V_M$ by the motional vector detector 60, and the past coefficients $C_p$ are shifted in parallel to a position as shown by dashed lines in FIG. 13 (a). Thereafter, only the differences in coefficient between those $C_n$ shown by solid lines in FIG. 13 (b) and those $\overline{C_p}$ shown by dashed lines in FIG. 13 (a) are calculated as shown in FIG. 13 (c). As well understood by FIG. 13 (c), since the coefficient difference signals can further be reduced, it is possible to further increase the transmission efficiency.

Further, the motional vector is transmitted being multiplexed by the multiplexer 62 together with video information signals.

In the above embodiments, although cosine transform has been explained, by way of example, as a typical orthogonal transform coding method, it is of course possible to adopt other transformation methods of Fourier, Hadamard, Slant, KL, etc. without being limited to the cosine transformation technique.

As described above, in the image transformation system according to the present invention, the current transform signals are compared with the past transform signals for each block, and further the transform signals are coded only when the difference between the two is significant, it is possible to improve the transmission efficiency and to effectively utilize transmission channels.

What is claimed is:

1. An image transmission system comprising:
   (a) dividing means for dividing an image frame into a plurality of blocks;
   (b) transforming means responsive to said dividing means, for transforming video information signals block by block to generate transform coefficients in accordance with an orthogonal transform method;
   (c) detecting means responsive to said transforming means, for detecting differences in transform coefficient between a current frame and a past frame for each block and outputting a difference presence signal when a sum of the detected differences in transform coefficient in each block exceeds a predetermined threshold; and
   (d) coding means responsive to said transforming means and said detecting means, for coding and transmitting the transform coefficients block by block in response to the difference presence signal outputted from said detecting means.

2. The image transmission system as set forth in claim 1, wherein said detecting means comprises:
   (a) a frame memory responsive to said transforming means, for delaying transform coefficients $C_n$ corresponding to a current frame to obtain $C_{n-1}$ corresponding to a preceding frame in sequence;
   (b) a subtracter for subtracting a preceding transform coefficient $C_{n-1}$ from a current transform coefficient $C_n$ in sequence to obtain differences $\Delta C$ in transform coefficient between the two for each block; and
   (c) an adder for adding all the obtained differences in transform coefficient before comparison with the threshold to generate a difference presence signal for each block.

3. The image transmission system as set forth in claim 2, wherein said detecting means further comprises weighting means for weighting the differences in transform coefficient in such a way that the lower the transform coefficient order is, the greater will be the weighting, before adding all the transform coefficient differences.

4. The image transmission system as set forth in claim 1, wherein said transform coefficients being coded are transform coefficient differences $\Delta C$ and said coding means further comprises means for calculating differences in transform coefficient between said current frame and a past frame to code and transmit the calculated transform coefficient difference $\Delta C$.

5. The image transmission system as set forth in claim 4, wherein said transform coefficient difference calculating means comprises:
   (a) a decoder responsive to said coding means for decoding a coded transform coefficient difference $\Delta C$ to output a decoded coefficient difference $\Delta C'$;
   (b) an adder responsive to said decoder;
   (c) a frame memory responsive to said adder;
   (d) a subtractor responsive to said transforming means and said frame memory;
   (e) said subtractor subtracting a past transform coefficient $C_p$ outputted from said frame memory from a current transform coefficient $C_n$ outputted from said transforming means, and outputting said transform coefficient difference $\Delta C$ to said coding means; and
   (f) said adder adding the decoded coefficient difference $\Delta C$, outputted from said decoder and the past transform coefficient $C_p$ outputted from said frame memory, and outputting an added current transform coefficient $C_n'$ to said memory frame.

6. The image transmission system as set forth claim 5, wherein said transform coefficient difference generating means further comprises:
   (a) a motional vector detector responsive to said transforming means and said frame memory, for detecting a parallel motion distance between transform coefficients $C_n$ of a current frame and those $C_p$ of a past frame and outputting a motional vector $V_M$; and
   (b) a motion compensator responsive to said motional vector detector and said frame memory, for compensating the transform coefficients $C_p$ of the past frame with the detected parallel motion distance vector $V_M$ to output a compensated coefficient $\overline{C_p}$ before subtracting the compensated past coefficient $\overline{C_p}$ from the current coefficient $C_n$.

7. The image transmission system as set forth claim 6, wherein said transform coefficient difference generating means further comprises a multiplexer for transmitting the detected motional vector $V_M$ together with the coefficient difference $\Delta C$.

8. A method of transmitting an image, which comprises the following steps of:
   (a) dividing an image frame into a plurality of blocks;
   (b) transforming video signals block by block to generate transform coefficients in accordance with an orthogonal transform method;
   (c) detecting differences in transform coefficient between a current frame and a past frame for each block to output a difference presence signal when a sum of the detected differences in transform coefficient in each block exceeds a predetermined threshold; and
   (d) coding and transmitting the transform coefficients block by block only when the difference presence signal is detected.

9. The method of transmitting an image as set forth in claim 8, wherein said step of detecting a difference in transform coefficient comprises the following steps of:
   (a) delaying transform coefficients $C_n$ corresponding to a current frame to obtain $C_{n-1}$ corresponding to a preceding frame in sequence;
   (b) subtracting a preceding transform coefficient $C_{n-1}$ from a current transform coefficient $C_n$ in sequence to obtain differences $\Delta C$ in transform coefficient between the two for each block; and
   (c) adding all the obtained differences in transform coefficient before comparison with the threshold to generate said difference presence signal for each block.

10. The method of transmitting an image as set forth in claim 9, wherein said step of detecting a difference in transform coefficient further comprises a step of weighting the difference $\Delta C$ in transform coefficient in such a way that the lower the transform coefficient order is, the greater will be the weighting, before adding all the transform coefficient differences.

11. The method of transmitting an image as set forth claim 8, wherein said step of detecting a difference in transform coefficient comprises the following steps of:
   (a) forming a transform coefficient matrix on the basis of the transform coefficients for each block;

(b) dividing the formed transform coefficient matrix into several domains;

(c) detecting a difference in matrix transform coefficient between a current frame and a preceding frame at each divided domain of each block;

(d) adding the detected differences in matrix transform coefficient; and (e) generating said difference presence signal when the added difference exceeds a predetermined threshold.

12. The method of transmitting an image as set forth in claim 11, wherein said step of detecting a difference in transform coefficient further comprises a step of weighting the matrix transform coefficients in different way according to the divided domains, when the detected difference exceeds a predetermined threshold, in such a way that the lower the matrix coefficient order is, the greater will be the weighting.

13. The method of transmitting an image as set forth in claim 11, wherein the matrix transform coefficients are divided into plural domains being ranged from a lowest-order matrix coefficient to a highest-order matrix coefficient in order.

14. The method of transmitting an image as set forth in claim 8, wherein said transform coefficients being coded to transform coefficient differences $\Delta C$ and said step of coding the transformed further comprises a step of calculating a difference in transform coefficient between said current frame and a past frame to code and transmit the calculated transform coefficient differences $\Delta C$.

15. The method of transmitting an image as set forth in claim 14, wherein said step of calculating transform coefficient differences further comprises the following steps of:

(a) detecting a parallel motion distance between transform coefficients $C_n$ of a current frame and those $C_p$ of a past frame to obtain a motional vector $V_M$; and (b) compensating the past transform coefficients $C_p$ with the detected parallel motion distance vector $V_M$ to obtain a compensated past coefficients before subtracting the coefficients $\overline{C_p}$ from those $C_n$.

* * * * *